United States Patent [19]
Oku

[11] Patent Number: 5,621,550
[45] Date of Patent: Apr. 15, 1997

[54] COLOR LIQUID CRYSTAL DISPLAY DEVICE HAVING THREE DICHROIC MIRRORS PER PIXEL

[75] Inventor: Kentaro Oku, Mobara, Japan

[73] Assignee: Hitachi, Ltd., Tokyo, Japan

[21] Appl. No.: 548,618

[22] Filed: Oct. 26, 1995

[30] Foreign Application Priority Data

May 31, 1995 [JP] Japan ................... 7-133411

[51] Int. Cl.$^6$ .................... G02F 1/1335; G02B 27/14
[52] U.S. Cl. ................................. 349/5; 359/634
[58] Field of Search ................... 359/40, 41, 68, 359/634; 353/31

[56] References Cited

U.S. PATENT DOCUMENTS

| | | | |
|---|---|---|---|
| 4,798,448 | 1/1989 | van Raalte | 359/41 |
| 5,029,986 | 7/1991 | De Vaan | 359/49 |
| 5,161,042 | 11/1992 | Hamada | 359/41 |
| 5,185,712 | 2/1993 | Sato et al. | 359/634 |
| 5,305,146 | 4/1994 | Nakagaki et al. | 359/634 |
| 5,526,147 | 6/1996 | Omae et al. | 359/40 |

*Primary Examiner*—Anita Pellman Gross
*Assistant Examiner*—Toan Ton
*Attorney, Agent, or Firm*—Antonelli, Terry, Stout & Kraus, LLP

[57] ABSTRACT

Light in each of a series of very small areas arranged in a row is subjected to color separation and color mixing into a very small portion of light. There are provided columnar concave lenses CC1 corresponding to columnar convex lenses CV1 formed in a lattice pattern, dichroic mirrors DM1, DM2 each associated with the concave lenses CC1, mirrors M1 each associated with the dichroic mirrors DM2, and a liquid crystal panel main body LP disposed in contact with this optical element. Pixels LR, LG, LB in the liquid crystal panel main body LP are disposed so as to correspond in position to the mirrors M1, the dichroic mirrors DM2 and the mirrors M2, respectively.

12 Claims, 10 Drawing Sheets

COLOR LIQUID CRYSTAL DISPLAY DEVICE HAVING THREE DICHROIC MIRRORS PER PIXEL

BACKGROUND OF THE INVENTION

The present invention relates to an optical element with a color processing section, and its manufacturing methods and its application to a liquid crystal panel, a liquid crystal display device, and a solid-state imaging device.

FIG. 12 is a schematic diagram illustrating a conventional liquid crystal display device. As shown in FIG. 12, the conventional liquid crystal display device comprises a reflective plate RF provided near a lamp LM, a screen SC provided on the opposite side the reflective plate RF with respect to the lamp LM, a liquid crystal panel LCP1 provided between the lamp LM and the screen SC, a condenser lens CL provided between the lamp LM and the liquid crystal panel LCP1, and a projection lens LNS provided between the liquid crystal panel LCP1 and the screen SC.

In the liquid crystal display device shown in FIG. 12, light from the lamp LM falls on the liquid crystal panel LCP1 via the condenser lens CL, and an image displayed on the liquid crystal panel LCP1 is projected onto the screen SC through the projection lens LNS.

A liquid crystal display device of this type is simple in construction.

FIG. 13 is a schematic diagram illustrating another conventional liquid crystal display device. As shown in FIG. 13, this liquid crystal display device comprises a dichroic mirror (interference filter) DM11 for reflecting blue light B; a dichroic mirror DM12 for reflecting green light G; a mirror M11; a mirror M12 associated with the dichroic mirror DM11; a mirror M13 associated with the mirror M11; a dichroic prism DP provided between a combination of the dichroic mirror DM12 and the mirrors M12, M13, and a projection lens LNS; and liquid crystal panels LCP2 provided between the combination of the dichroic mirror DM12 and the mirrors M12, M13, and the dichroic prism DP; the dichroic mirrors DM11, DM12 and the mirror M11 being located on the opposite side of the reflective plate RF with respect to lamp LM.

In the liquid crystal display device shown in FIG. 13, light from the lamp LM is subjected by the dichroic mirrors DM11, DM12 to color separation into blue light B, green light G and red light R. The blue light B, the green light G and the red light R are each directed to a respective one of the liquid crystal panels LCP2, and are subjected by the dichroic prism DP to color mixing. Then, an image displayed on the liquid crystal panel LCP2 is projected on a screen SC by the projection lens LNS.

FIG. 14 is a schematic diagram illustrating still another conventional liquid crystal display device. As shown in FIG. 14, this liquid crystal display device comprises a mirror M14 provided at the opposite side of the reflective plate RF with respect to lamp LM; a dichroic mirror DM13 for reflecting green light G, recieved from the mirror M14; a dichroic mirror DM14 for reflecting blue light B; a mirror M15 associated with the dichroic mirror DM13; a dichroic mirror DM15 for reflecting blue light B, recieved from the dichroic mirror DM14; a dichroic mirror DM16 for reflecting red light R, received from the mirror M14; a condenser lens CL and a liquid crystal panel LCP2 provided between the mirror M15 and the dichroic mirror DM15; a condenser lens CL and a liquid crystal panel disposed between the dichroic mirrors DM14, DM15; and a condenser lens CL and a liquid crystal panel disposed between the dichroic mirror DM14 and the mirror M14.

In the liquid crystal display device shown in FIG. 14, light from the lamp LM is subjected by the dichroic mirrors DM13, DM14 to color separation into green light G, blue light B and red light R. The blue light B, the green light G and the red light R are directed to respective ones of the liquid crystal panels LCP2, and are subjected by the dichroic mirrors DM15, DM16 to color mixing. Then, an image displayed on the liquid crystal panel LCP2 is projected on a screen SC by a projection lens LNS.

The brightness of the image projected on the screen in these liquid crystal display devices is not lowered because it is unnecessary to use red, green and blue color filters of for respective pixels of the liquid crystal panel LCP2.

Incidentally, "Large Screen Projection Display" pp 164–, February, 1991, the Journal of the Institute of Television Engineers of Japan, describes a liquid crystal display of this type representative of the prior art.

SUMMARY OF THE INVENTION

In the liquid crystal display device of FIG. 12, however, the brightness of the image projected onto the screen SC tends to be lowered due to the need of use for red, green, blue color filters for each pixel of the liquid crystal panel LCP1.

In the liquid crystal display devices of FIGS. 13, 14, moreover, the devices tend to become large in scale, since three liquid crystal panels LCP2 are needed.

An object of the present invention, is to solve the foregoing problems, by providing an optical element capable of seperating the colors of the light from each of very small arrayed areas, a liquid crystal panel having a high transmittance, a liquid crystal display device which can project a bright image onto a screen and whose scale is small, thereby providing a highly sensitive solid-state imaging device.

In order to accomplish the foregoing object, an optical element according to the present invention is provided with a color processing section in which lenses and a color separator and possibly a color mixer associated with the lenses are arranged next to one another.

Further, the optical element is provided in association with the color processing section in a liquid crystal panel in which pixels are arranged in a lattice pattern.

Further, the optical element is provided so that the pixels in portion to elements of the color processing section in a liquid crystal display device having a liquid crystal panel in which pixels are arranged in a lattice pattern.

Further, the optical element is provided so that the pixels correspond in position to elements of the color processing section in a solid-state imaging device in which pixels are arranged in a lattice pattern.

The colors of light can be separated by the color processing section of the optical element.

Further, color filters are unnecessary in the liquid crystal panel.

Further, color filters are not provided on the liquid crystal panel so that only one liquid crystal panel is needed in the liquid crystal display device.

Further, color filters are unnecessary in the solid-state imaging device.

The foregoing and other objects, advantages, manner of operation and novel features of the present invention will be

DESCRIPTION OF THE PREFERRED EMBODIMENTS

Figure 1:
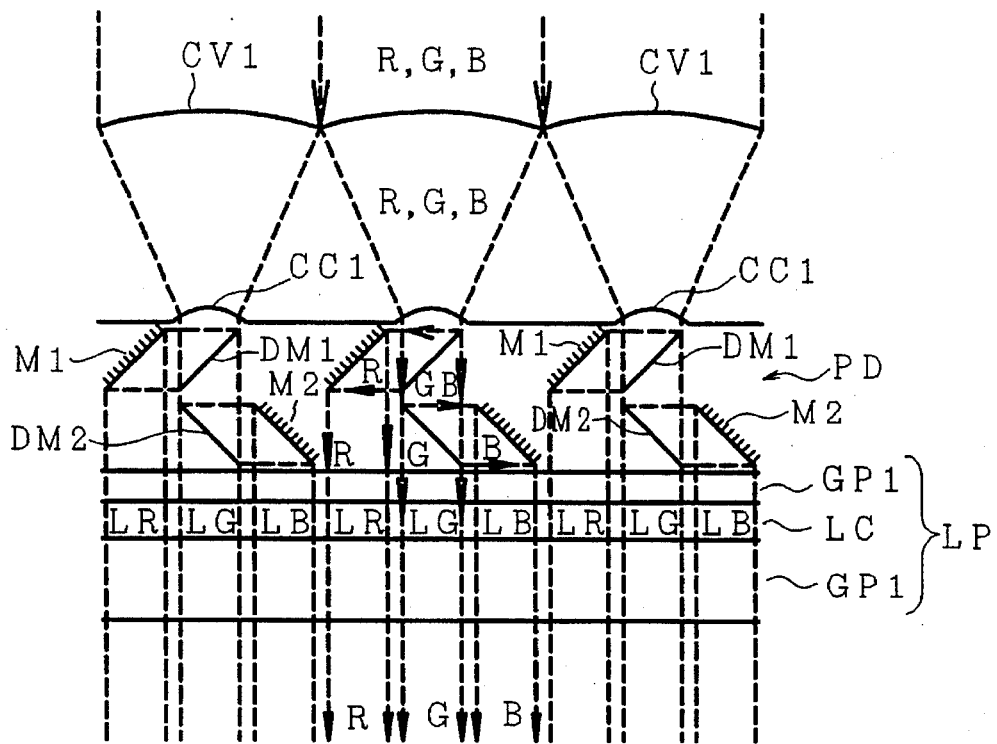
FIG. 1 is a sectional view showing an optical element and part of a liquid crystal panel according to the present invention.

FIG. 1 is a sectional view showing a liquid crystal panel having an optical element according to the present invention, that is, part of a liquid crystal panel according to the present invention. As shown in FIG. 1, there are provided columnar concave lenses CC1 each corresponding to columnar convex lenses CV1 in a lattice pattern, dichroic mirrors DM1 for reflecting red light R but transmitting green light G and blue right B, dichroic mirrors DM2 for reflecting blue light R but transmitting red light R and green light G, the dichroic mirrors DM1, DM2 being provided in association with the respective concave lenses CC1; mirrors M1 each provided in association with the dichroic mirrors DM1; and mirrors M2 provided correspondingly to the respective dichroic mirrors DM2. The dichroic mirrors DM1, DM2 and the mirrors M1, M2 constitute a color separator PD, and the color separator PD, the convex lenses CV1 and the concave lenses CC1 constitute a color processing section. Moreover, a liquid panel main body LP in contact with the optical element is provided therein and includes two glass plates GP1 and a liquid crystal portion LC inbetween, having red pixels LR, green pixels LG and blue pixels LB. Further, the red pixels LR in position to the respective mirrors M1, the green pixels LG correspond in position to the respective dichroic mirrors DM2, and the blue pixels LB correspond in position to the respective mirrors M2.

In the optical element and the liquid crystal panel, light from a lamp (not shown) enters the convex lenses CV1 and is condensed. The light thus condensed is transformed by the concave lenses CC1 to parallel beams of light, which are separated by dichroic mirrors DM1, DM2 into red light R, green light G and blue light B. In other words, only parallel beams of red light R are reflected by the dichroic mirrors DM1 and reflected again by the mirrors M1. Further, only parallel beams of blue light B are reflected by the dichroic mirrors DM2 and reflected again by the mirrors M2. Further, parallel beams of green light G are passed through the dichroic mirrors DM1, DM2. The red light R, the green light G and the blue light B thus separated by the optical element are respectively directed to the pixels LR, LG, LB before being modulated by the corresponding pixels LR, LG, LB. Incidentally, a description has been given of the principle of interference filters in, for example, "Applied Optics", Hiroshi Kubota, pp.97–98, the Series of Iwanami Books, and "Imaging Engineering", Teruo Ninomiya, pp. 273–276, Corona Co. Moreover, a description has also been given of a design method in "Optical Engineering Series No. 11, Optical Thin Film", compiled by Shiro Fujiwara, pp. 110–124, Kyoritsu Shuppan.

In such an optical element, rays of light in very small areas arranged in a lattice pattern can be subjected to color separation without color filters since the rays of light can be separated by color in the color processing section. Moreover, transmittance is high because the provision of color filters is unnecessary in the liquid crystal panel.

Figure 2:
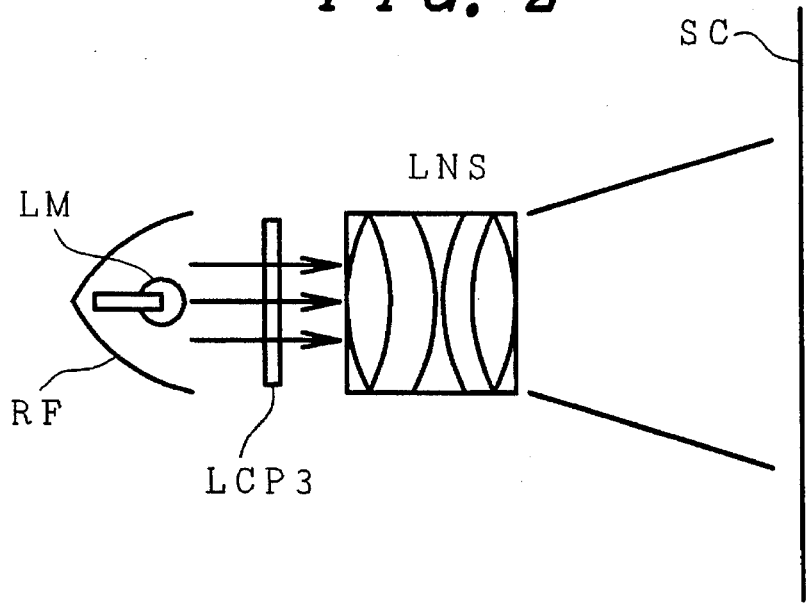
FIG. 2 is a schematic diagram of a liquid crystal display device having the liquid crystal panel of FIG. 1.

FIG. 2 is a schematic diagram of a liquid crystal display device having the liquid crystal panel of FIG. 1, that is, of a liquid crystal display device according to the present invention. As shown in FIG. 2, a liquid crystal panel LCP3 is provided between a lamp LM and a projection lens LNS.

In the liquid crystal display device of FIG. 2, light from the lamp LM enters the liquid crystal panel LCP3, and an image displayed on the liquid crystal panel LCP is projected onto a screen SC by the projection lens LNS.

In such a liquid crystal display device, the brightness of the image projected onto the screen SC is not low because no color filter is needed for the liquid crystal panel LCP3, and the scale of the device is small because only one liquid crystal panel LCP3 is provided.

Figure 3:
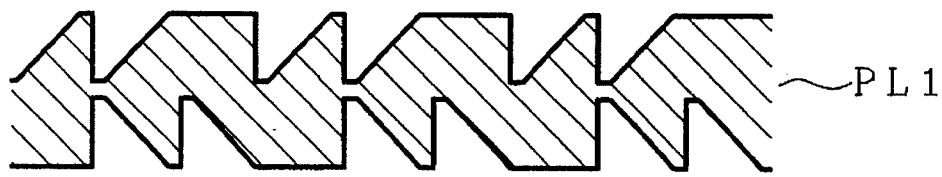
FIGS. 3(a)–(h) are a diagram illustrating the step of a process for producing the liquid crystal panel of FIG. 1.
Figure 3:
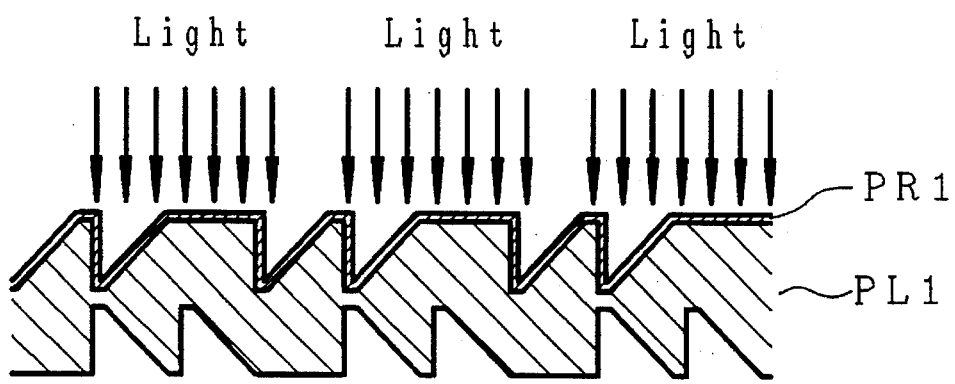
Figure 3:
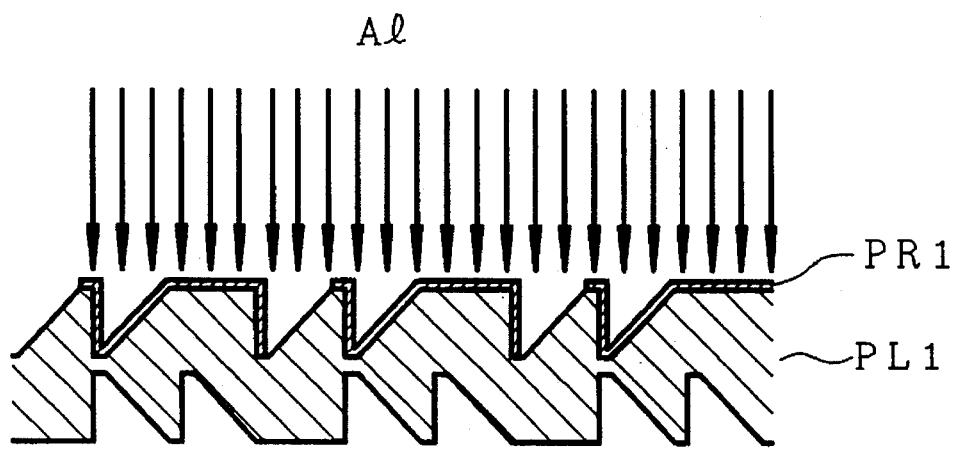
Figure 3D:
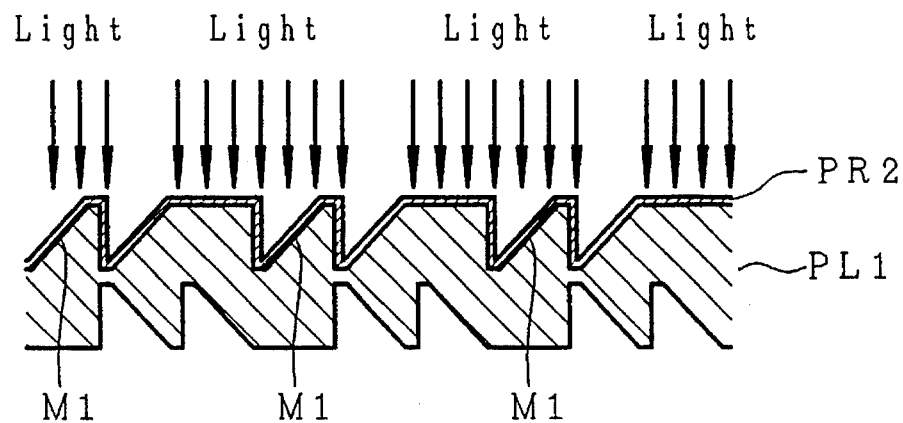
Figure 3E:
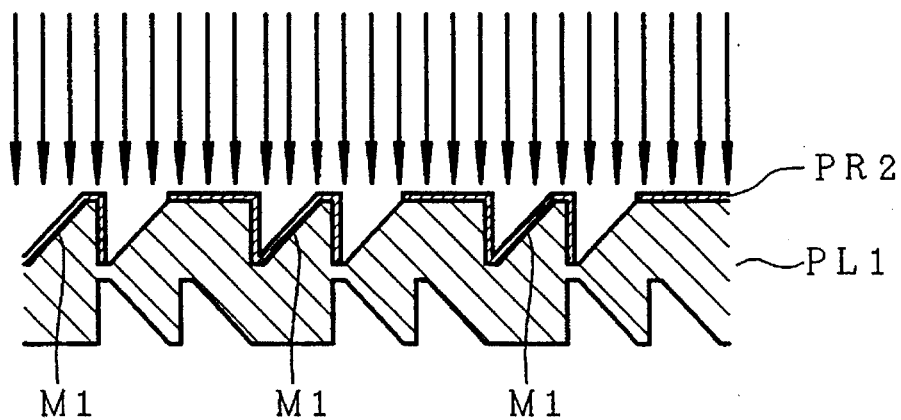
Figure 3F:
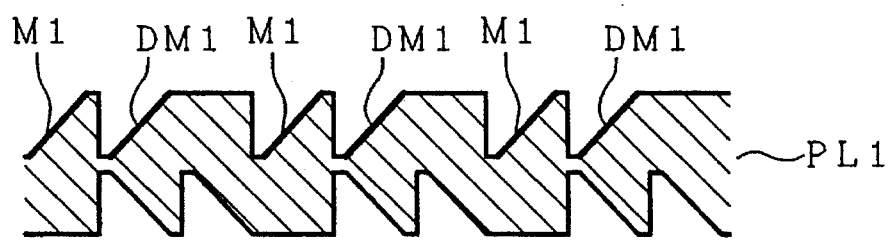
Figure 3G:
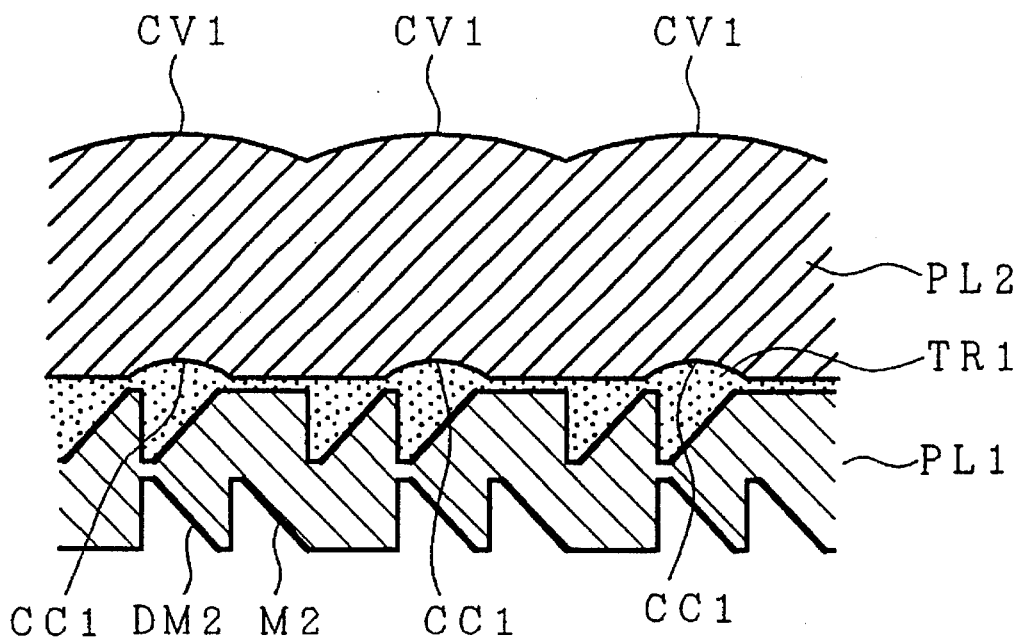
Figure 3H:
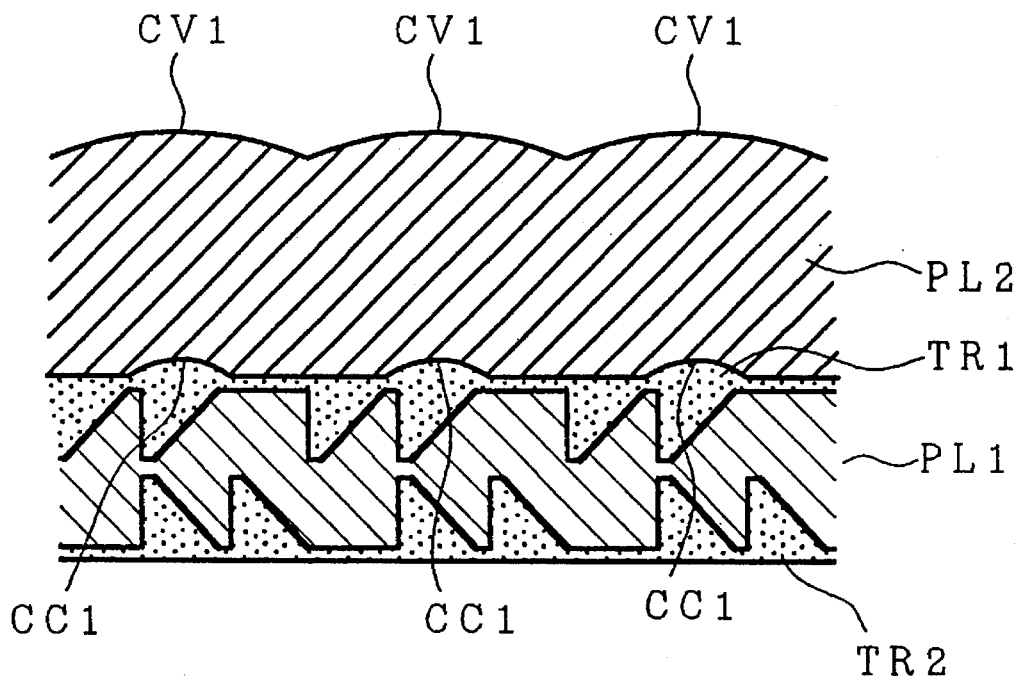
Figure 4:
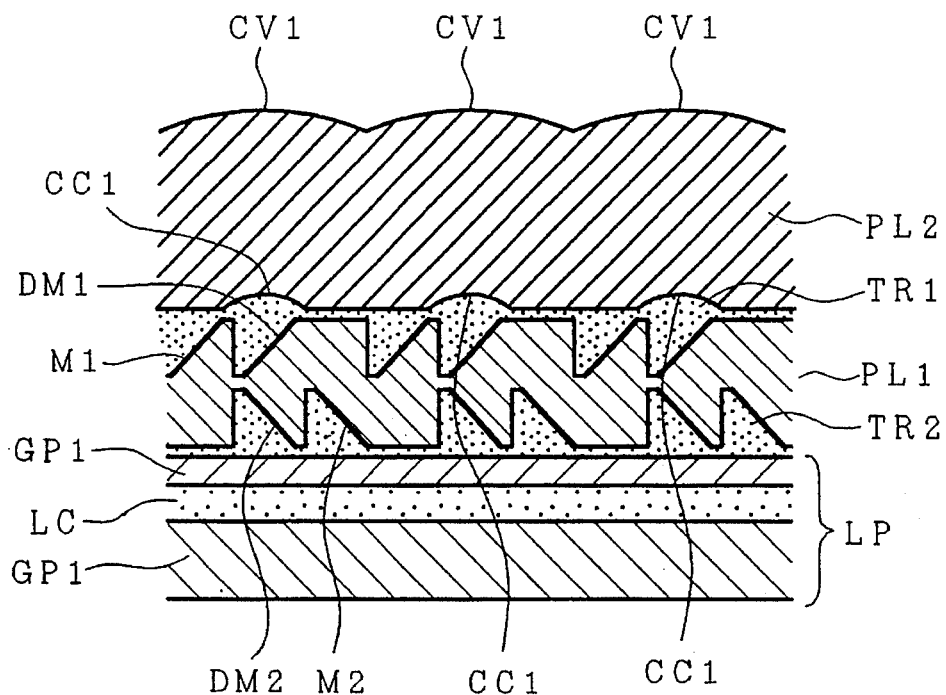
FIG. 4 is a diagram illustrating the process for producing the liquid crystal panel of FIG. 1.

A description will subsequently be given of a process for producing the liquid crystal panel shown in FIG. 1. First, a thin plastic plate PL1 in which grooves are provided in stripes, which are saw-toothed in cross section and perpendicular to the top surface and undersurface of the plate, by thermoforming-press, working grinding, injection-molding or the like, as shown in FIG. 3(a). Subsequently, a positive photoresist film (e.g., using polyvinyl alcohol as a base, and ammonium bichromate as a photosensitive agent) PR1 is provided on one side of the thin plate PL1 and the film excluding portions where the mirrors M1 are to be formed is exposed to light, as shown in FIG. 3(b). Then, the photoresist film PR1 in the portions where the mirrors M1 are to be formed is removed by rinsing with warm water, and an aluminum film is formed by vapor deposition, as shown in FIG. 3(c). Then, the photoresist film PR1 is removed by rinsing with a hydrogen peroxide aqueous solution to form the mirrors M1, a positive photoresist film PR2 is provided, and the film excluding portions where the dichroic mirrors DM1 are to be formed are exposed to light as shown in FIG. 3(d). Then, portions of the photoresist film PR2 where the dichroic mirrors DM1 are to be formed are removed by rinsing with warm water, and a multilayer thin metal film is formed by vapor deposition, as shown in FIG. 3(e). Then the photoresist film PR2 is removed by rinsing with hydrogen peroxide aqueous solution to form the dichroic mirrors DM1 as shown in FIG. 3(f). As shown in FIG. 3(g), the dichroic mirrors DM2 and the mirrors M2 are formed through the same process as stated above, and convex lenses CV1 and concave lenses CC1 are provided. Further, a thin plastic plate PL2 whose refractive index differs from that of the thin plate PL1 is formed by thermoforming-press, working grinding, injection-molding or the like and a curing transparent resin TR1 whose refractive index is substantially equal to that of the thin plate PL1 is used to bond the thin plates PL1, PL2 together. Subsequently, a curing transparent resin TR2 whose refractive index is substantially equal to that of the thin plate PL1 is applied uniformly to the face of the thin plate PL1 where the dichroic mirrors DM2 and the mirrors M2 are formed to complete an optical element, as shown in FIG. 3(h). Then the liquid crystal panel main body LP is bonded to the thin plate PL1, as shown in FIG. 4.

Figure 5:
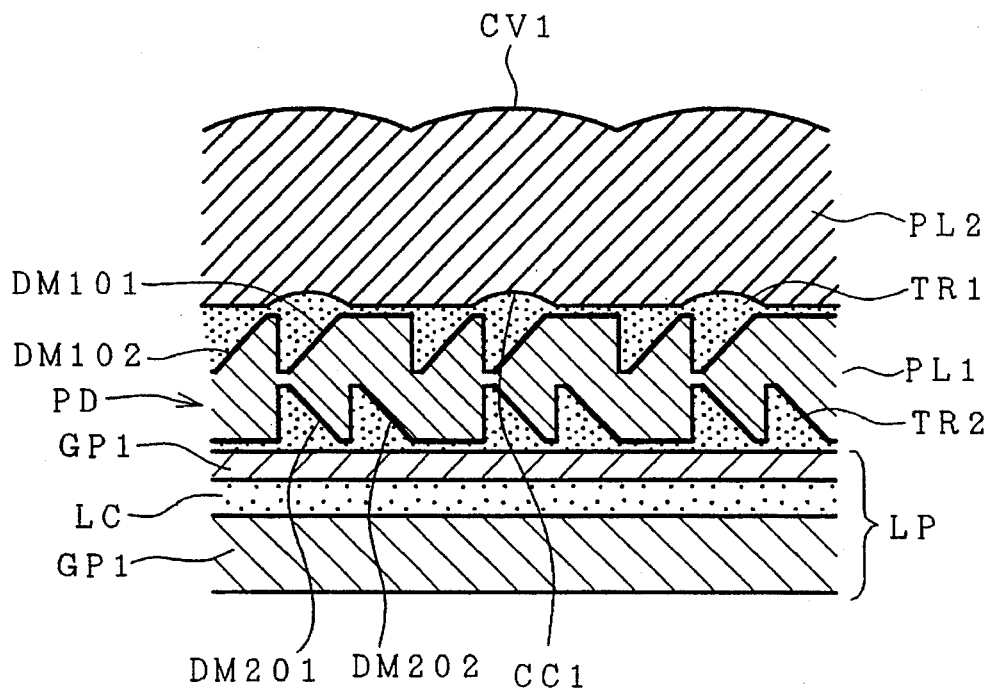
FIG. 5 is a sectional view showing another optical element and part of a liquid crystal panel according to the present invention.

FIG. 5 is a sectional view showing a liquid crystal panel having another optical element, that is, part of a liquid crystal panel according to the present invention. As shown in FIG. 5, there are provided dichroic mirrors DM101 for reflectng red light R but transmitting green light G and blue light B, and dichroic mirrors DM201 which reflect blue light B but transmit red light R and green light G, the dichroic mirrors DM101, DM201 each corresponding in position to concave lenses CC1; dichroic mirrors DM102 for reflecting red light R but transmitting green light G and blue light B, the dichroic mirrors DM102 each being associated with the dichroic mirrors DM101; and dichroic mirrors DM202 for reflecting blue light B but transmitting red light R and green light G, the dichroic mirrors DM202 each being associated with the dichroic mirrors DM201. The dichroic mirrors DM101, DM102, DM201, DM202 constitute a color separator PD, and the color separator PD, convex lenses CV1 and the concave lenses CC1 constitute a color processing section. Moreover, a liquid crystal panel main body LP is situated close to the optical element. Red pixels, green pixels and blue pixels in a liquid crystal portion correspond in position to the dichroic mirrors DM102, DM201 and DM202, respectively.

In this optical element, light from a lamp (not shown) falls on the convex lens CV1 and is condensed. The light thus condensed is transformed by the concave lenses CC1 to parallel beams of light, which are separated by the dichroic mirrors DM101, DM102, DM201, DM202 into red light R, green light G and blue light B. In other words, only parallel beams of red light R are reflected by the dichroic mirrors DM101 and reflected again by the dichroic mirrors DM102. Further, only parallel beams of blue light B are reflected by the dichroic mirrors DM201 and reflected again by the dichroic mirrors DM202. Further, parallel beams of green light G are passed through the dichroic mirrors DM101, DM201.

Figure 6:
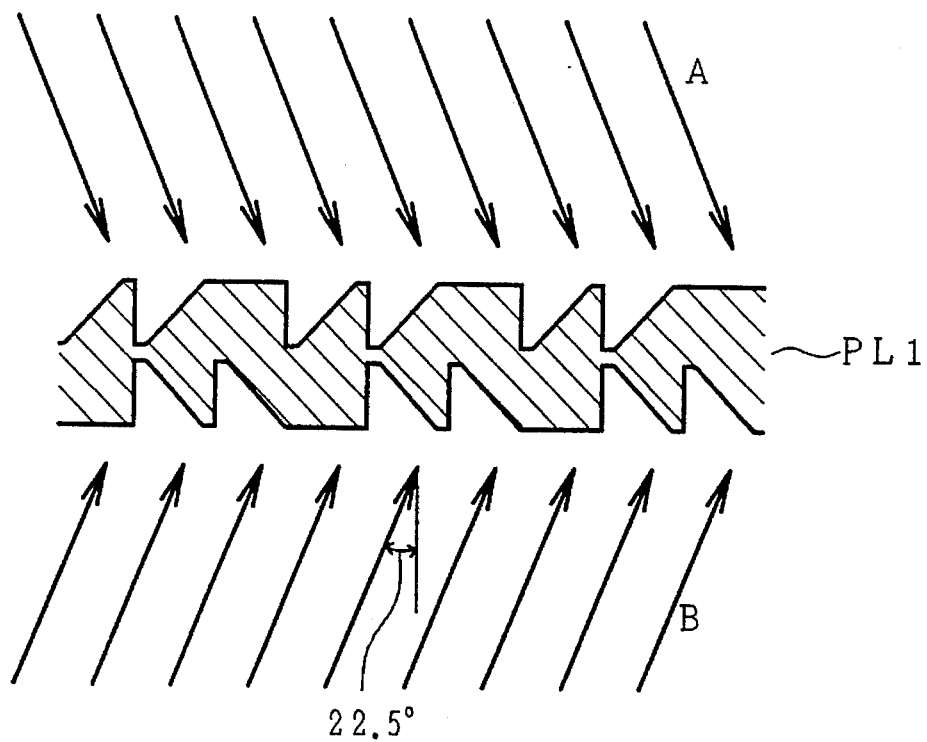
FIG. 6 is a diagram illustrating a process for producing the liquid crystal panel of FIG. 5.

In such an optical element, as shown in FIG. 6 the dichroic mirrors DM101, DM102, DM201, DM202 can be formed by vapor-depositing a multilayer metal layer onto the top surface and undersurface of the thin plate PL1 from the directions indicated by arrows A, B, that is, at oblique angles of about 22.5°. In this case, the multilayer metal film is not vapor-deposited on each vertical face of the thin plate PL1. Therefore, the liquid crystal panel can readily be manufactured since the dichroic mirrors DM101, DM102, DM201, DM202 are formable without forming photoresist films.

Figure 7:
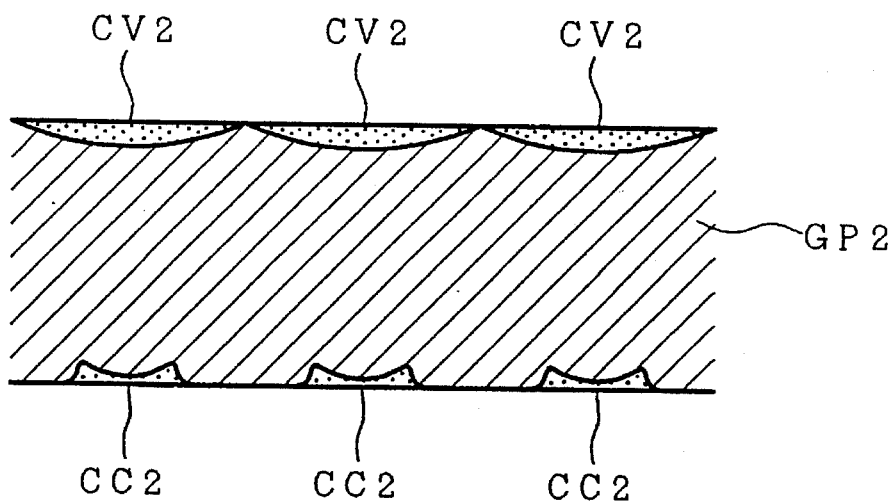
FIG. 7 is a sectional view showing part of another optical element according to the present invention.

FIG. 7 is a sectional view showing part of another optical element according to the present invention. As shown in FIG. 7, refractive-index distributed type convex lenses CV2 and concave lenses CC2 are provided in a glass plate GP2. A known technique, such as the electric-field introducing method, the ion exchange method or the like may be used to form the refractive-index distributed area, as disclosed in Japanese Patent Laid-Open Nos. 165621/1985, 182719/1991.

Figure 8:
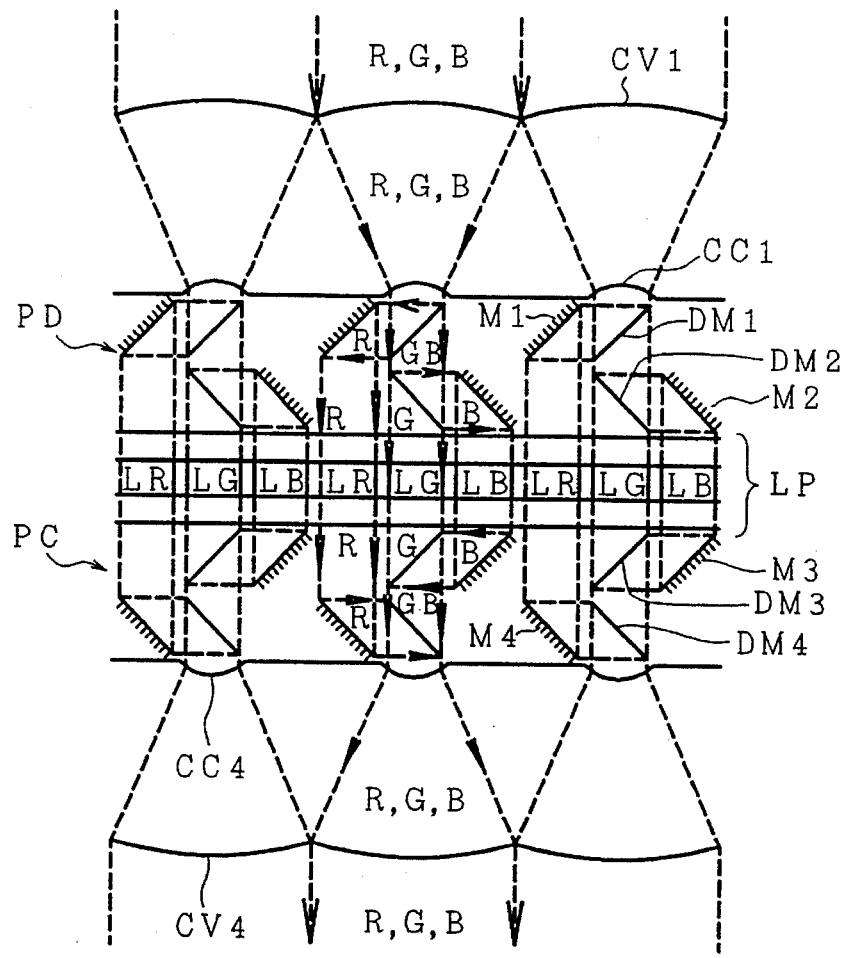
FIG. 8 is a sectional view showing part of another liquid crystal panel according to the present invention.
Figure 10:
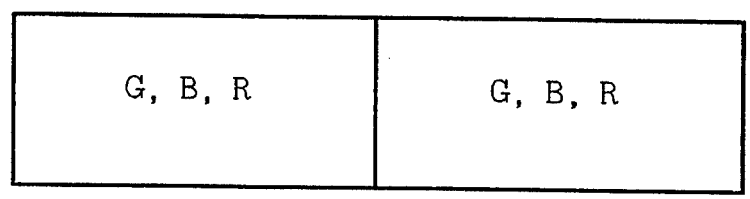
FIG. 10 is a diagram illustrating a projected image on the liquid crystal panel of FIG. 8.

FIG. 8 is a sectional view showing part of another liquid crystal panel according to the present invention. As shown in FIG. 10, an optical element having a color mixer substantially similar in structure to the color separator PD is provided on the light emission side of the liquid crystal panel main body LP. More specifically, there are provided columnar convex lenses CV4 each corresponding to convex lenses CV1; columnar concave lenses CC4 corresponding to the convex lenses CV4; dichroic mirrors DM4 for reflecting red light R and dichroic mirrors DM3 for reflecting blue light B, the dichroic mirrors DM4, DM3 each associated with the concave lenses CC4; mirrors M4 each associated with the dichroic mirrors DM4; and mirrors M3 each associated with the dichroic mirrors DM3. The dichroic mirrors DM3, DM4 and the mirrors M3, M4 constitute a color mixer PC, and the color mixer PC, the convex lenses CV4 and the concave lenses CC4 constitute a color processing section. In this case, color pixels LR in position to the mirrors M4; color pixels LG correspond in position to the dichroic mirrors DM3; and color pixels LB correspond in positon to the mirrors M3.

In the liquid crystal panel of FIG. 8, red light R, green light G and blue light B thus separated by the optical element having the color separator PD each enter respective pixels LR, LG, LB and are modulated by them. Then, the red light R, the green light G and the blue light B thus modulated by the pixels LR, LG, LB are mixed by the color mixer PC, and directed by the concave lenses CC4 to become parallel beams means of the convex lenses CV4.

Figure 9:
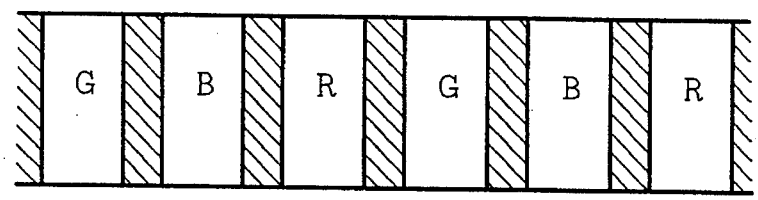
FIG. 9 is a diagram illustrating a projected image on the liquid crystal panel of FIG. 1.

A more natural image is obtainable by this type of liquid crystal panel. In the liquid crystal panel of FIG. 1, the projected images of red light R, green light G and blue light B pass through the respective pixels LR, LG, LB have dark partitions therebetween as shown in FIG. 9, whereas in the liquid crystal panel of FIG. 8, a string of mixed colors are arranged in a row without such a dark partition as shown in FIG. 10.

Figure 11:
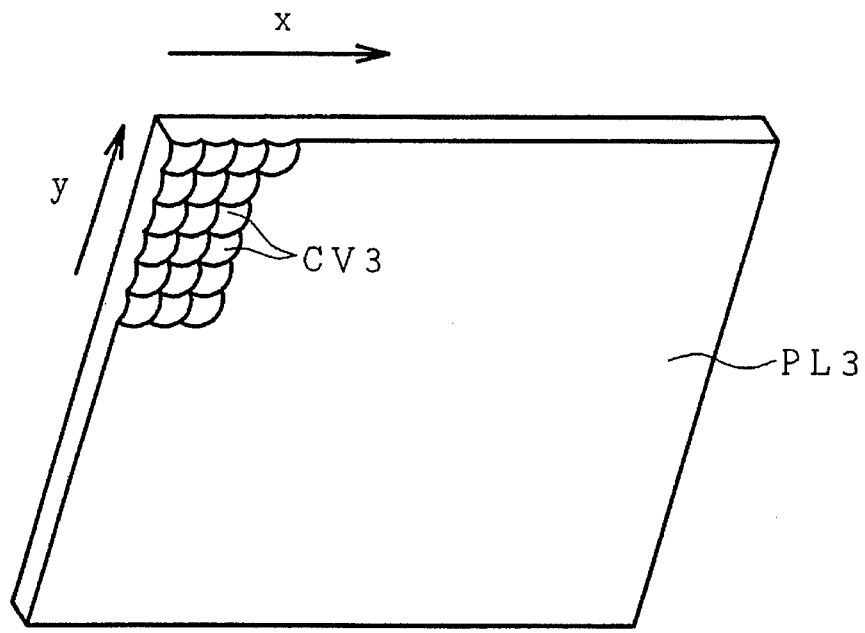
FIG. 11 is a perspective view showing part of an optical element according to the present invention.
Figure 12:
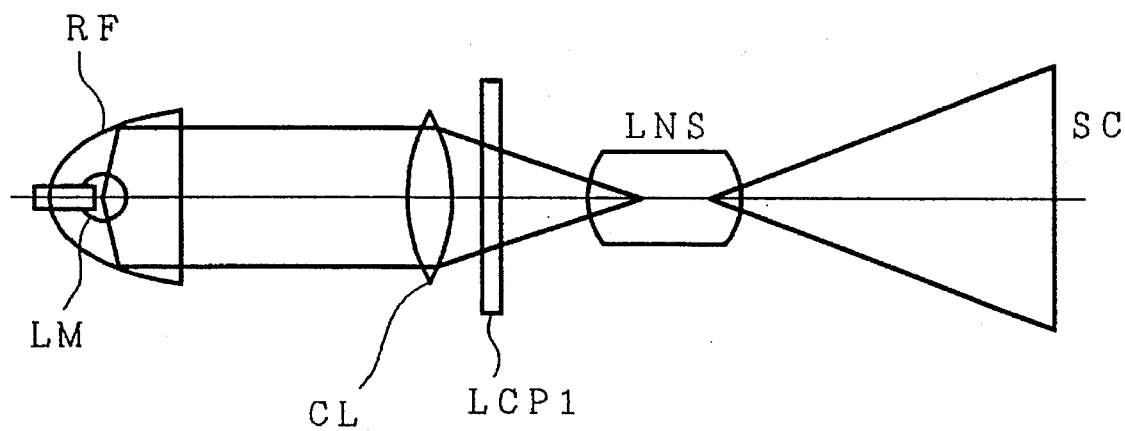
FIG. 12 is a schematic diagram of a conventional liquid crystal display device.
Figure 13:
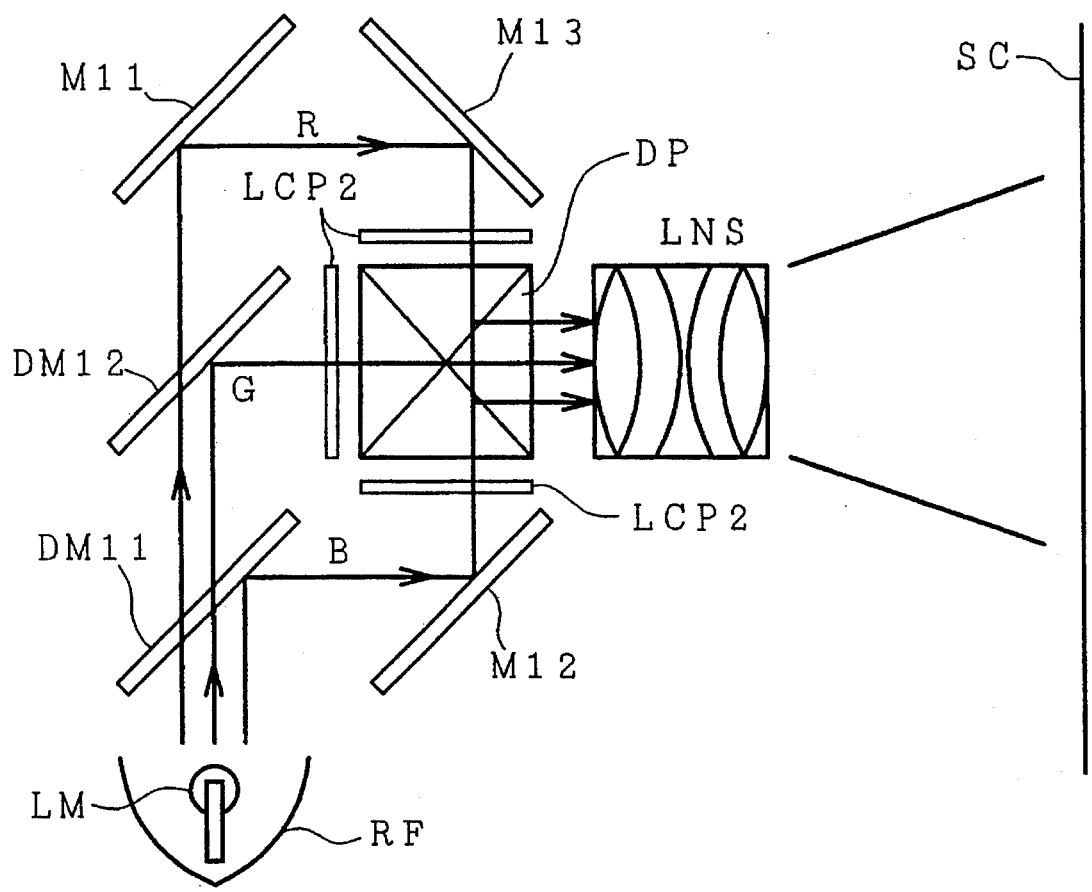
FIG. 13 is a schematic diagram of another conventional liquid crystal display device.
Figure 14:
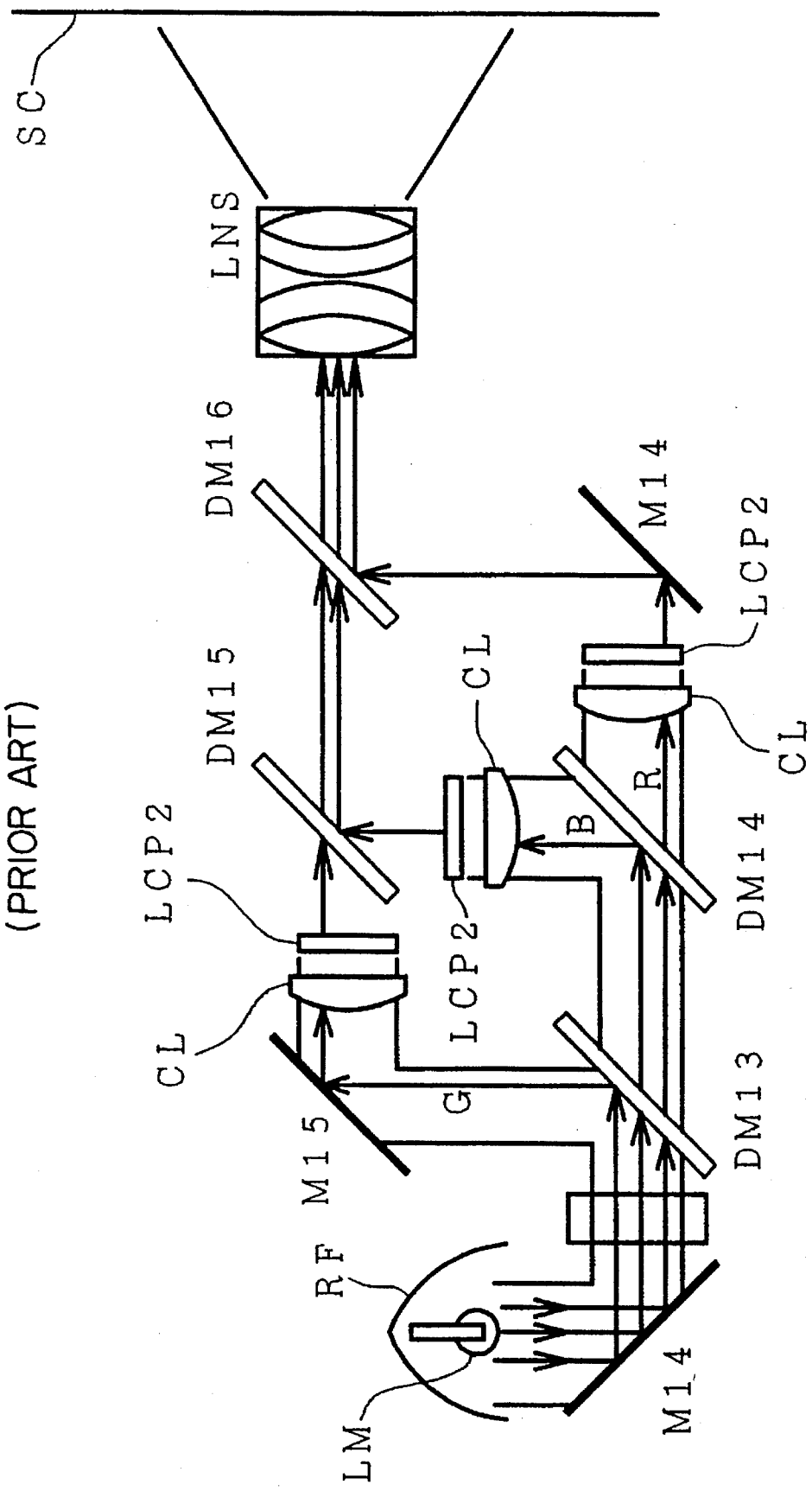
FIG. 14 is a schematic diagram of still another conventional liquid crystal display device.

FIG. 11 is a perspective view showing part of an optical element according to the present invention. As shown in FIG. 11, spherical convex lenses CV3 (like eyes of a fly) and concave lenses (not shown) are provided on a thin plastic plate PL3.

In this optical element, the transmittance is further improvable in comparison with columnar lenses since light can be condensed in not only the x- but also the y-direction.

Although the description given above is of a projection liquid crystal display, the present invention is needless to say applicable to a color liquid crystal display having a back light and any other reflection type color liquid crystal display.

In such a reflection type color liquid crystal display, a mirror in contact with the liquid crystal panel main body LP of FIG. 4 is provided, and red light R, green light G and blue light B reflected by the mirror are mixed again by the color separator PD. In other words, the color sepatator PD also plays the role of the color mixer PC of FIG. 8.

As the brightness is insufficient when a color filter is used in a conventional reflective liquid crystal display, this liquid crystal display has been unfit for color display. When the optical element according to the present invention is employed, a sufficient brightness is obtained, so that it becomes possible to put the reflective color liquid crystal display to practical use.

In the solid-state imaging device in which pixels are provided in a lattice pattern, no color filters are needed because the optical element of FIG. 1 is provided so as to make the pixels correspond in position to the color processing section; therefore a high sensitivity is ensured thereby.

Although the color processing section is arranged linearly in the embodiments of the present invention described above, the color processing section may be provided in a lattice pattern or in only one row. Although the optical element is used for separating the light into red light R, green light G and blue light B in the embodiments thereof, the light may be separated into at least two kinds of light having different wavelengths. Although a description has been given of a liquid crystal panel, a liquid crystal display device and a solid-state imaging device having the optical element, such an optical element as shown in FIG. 1 may also be used for any other kind of imaging devices, measuring instruments or the like.

As set forth above, light in very small areas arranged in a row can be subjected to color separation and color mixing since the color separation and the color mixing of the light are possible in the color processing section of the optical element according to the present invention.

Moreover, the transmittance is high because no color filters are required in the liquid crystal panel according to the present invention.

Further, a substantially high brightness of the image projected onto the screen is ensured because no color filters are needed for the liquid crystal panel in the liquid crystal display device, and the scale of the device is small since only one liquid crystal panel is provided according to the present invention.

In addition, a high sensitivity is obtainable because no color filters are required in the solid-state imaging device according to the present invention.

What is claimed is:

1. An optical element having a color processing section comprising pairs of convex and concave lenses provided for each of three pixels corresponding to three primary colors, and at least one of a color separator and a color mixer including a dichroic mirror for transmitting first and second primary colors out of the three primary colors but reflecting the third primary color, a mirror for reflecting the reflected third primary color, a dichroic mirror for transmitting the second and third primary colors out of three primary colors but reflecting the first primary color, and a mirror reflecting the reflected first primary color, the lenses and the at least one color separator or color mixer being arranged in a row.

2. An optical element having a color processing section comprising pairs of convex and concave lenses provided for each of three pixels corresponding to three primary colors, and at least one of a color separator and a color mixer including a dichroic mirror for transmitting first and second primary colors out of the three primary colors but reflecting the third primary color, a dichroic mirror for reflecting the reflected third primary color, a dichroic mirror for transmitting the second and third primary colors out of the three primary colors but reflecting the first primary color, and a dichroic mirror for reflecting the reflected first primary color, the lenses and the at least one color separator or color mixer being arranged in a row.

3. An optical element as claimed in claim 1, wherein the color processing section includes one plastic plate which has a saw-toothed cross section and grooves formed in stripes perpendicularly to the cross section, wherein on each of the sloping faces of the saw-toothed cross section on one side of the thin plastic plate, dichroic mirrors for transmitting first and second primary colors out of three primary colors but reflecting the third primary color and mirrors for reflecting the reflected third primary color are alternately formed in a predetermined pattern, and wherein on each of the sloping faces of the saw-toothed cross section on the other side of the thin plastic plate, dichroic mirrors for transmitting second and third primary colors out of the three primary colors but reflecting the first primary color and mirrors for reflecting the reflected first primary color are alternately formed in a predetermined pattern.

4. An optical element as claimed in claim 2, wherein the color processing section includes one thin plastic plate which has a saw-toothed cross section and grooves formed in stripes perpendicularly to the cross section of the plate, wherein on each of the sloping faces of the saw-toothed cross section on one side of the thin plastic plate, dichroic mirrors for transmitting first and second primary colors out of three primary colors but reflecting the third primary color are formed in a predetermined pattern, and wherein on each of the sloping faces of the saw-toothed cross section on the other side of the thin plastic plate, dichroic mirrors for transmitting the second and third primary colors out of the three primary colors but reflecting the first primary color are formed in a predetermined pattern.

5. An optical element as claimed in one of claims 1–2, wherein the lens are formed as a thin plate-like lens element of refractive-index distributed type formed on both sides of a glass plate or a thin plate-like lens formed by processing both sides of one plastic plate.

6. An optical element as claimed in one of claims 1–2, wherein the lenses and the at least one color separator or color mixer are bonded with a curing transparent resin whose refractive index is substantially equal to that of the lenses.

7. An optical element as claimed in one of claims 1–2, wherein a curing transparent resin whose refractive index is substantially equal to that of the at least one color separator or color mixer is bonded to the face of the at least one color separator or color mixer to make the face thereof a smooth face, the fact thereof being opposite to the face which faces the lenses.

8. A liquid crystal panel having pixels formed in a lattice pattern, wherein an optical element as claimed in one of claims 1–2 is provided, the pixels being so arranged as to correspond to elements of the color processing section.

9. A liquid crystal panel having pixels formed in a lattice pattern, and wherein an optical element having a color separator on a light incidence side and a color mixer on a light emission side as claimed in one of claims 1–2 is provided on respective sides of the lattice pattern.

10. A liquid crystal display device having a liquid crystal panel provided with pixels formed in a lattice pattern, wherein an optical element as claimed in one of claims 1–2 is provided, the pixels being so arranged as to correspond to the color processing section.

11. A liquid crystal display device having a reflection type liquid crystal panel provided with pixels formed in a lattice pattern, wherein an optical element having a color separator on a light incidence side as claimed in claims 1–2 is provided in contact with the reflection type liquid crystal panel via a mirror on a light reflection side of the panel.

12. A solid-state imaging device having pixels formed in a lattice position, wherein an optical element as claimed in claims 1–2 is provided by disposing the pixels so as to respectively correspond in position to elements of the color processing section.

* * * * *